United States Patent [19]

Eichler et al.

[11] Patent Number: 4,934,750
[45] Date of Patent: Jun. 19, 1990

[54] CENTER CONSOLE FOR MOTOR VEHICLES

[75] Inventors: Siegfried Eichler, Renningen; Juergen Koerber; Ulrich Bruhnke, both of Sindelfingen; Jakob Roth, Böblingen; Hans Trube, Herrenberg, all of Fed. Rep. of Germany

[73] Assignee: Daimler-Benz AG, Stuttgart, Fed. Rep. of Germany

[21] Appl. No.: 302,385

[22] Filed: Jan. 27, 1989

[30] Foreign Application Priority Data

Mar. 10, 1988 [DE] Fed. Rep. of Germany ....... 3807880

[51] Int. Cl.⁵ .............................................. B60R 7/00
[52] U.S. Cl. .................................... 296/37.8; 297/411; 297/194; 224/275
[58] Field of Search ............................ 296/37.8, 37.1; 297/411, 417, 194; 224/273, 275

[56]         References Cited
       U.S. PATENT DOCUMENTS

| 3,177,033 | 4/1965 | Daniels | 296/37.8 |
| 3,356,409 | 12/1967 | Belsky et al. | 224/275 X |
| 4,040,659 | 8/1977 | Arnold | 297/194 |
| 4,417,764 | 11/1983 | Marcus et al. | 297/194 |
| 4,453,759 | 6/1984 | Kathiria | 296/37.8 |
| 4,512,503 | 4/1985 | Gioso | 296/37.8 X |
| 4,756,459 | 7/1988 | Hardman | 296/37.8 X |
| 4,779,923 | 10/1988 | Lang et al. | 296/37.8 |
| 4,842,175 | 6/1989 | Towsend | 296/37.8 X |

FOREIGN PATENT DOCUMENTS

| 2017937 | 4/1970 | Fed. Rep. of Germany | 296/37.8 |
| 3143957 | 11/1981 | Fed. Rep. of Germany | . |
| 8437440 | 3/1985 | Fed. Rep. of Germany | . |
| 180339 | 10/1983 | Japan | 296/37.8 |

Primary Examiner—Margaret A. Focarino
Assistant Examiner—Joseph D. Pape
Attorney, Agent, or Firm—Evenson, Wands, Edwards, Lenahan & McKeown

[57]            ABSTRACT

A center console for motor vehicles includes storage compartment, a base body open in the upward direction and adapted to be covered by a pivotally connected cover member. An armrest is longitudinally displaceably supported on this cover member and can be transferred from a rearward pushed back position, located between the front vehicle seats, into a forward armrest position toward the instrument panel.

15 Claims, 3 Drawing Sheets

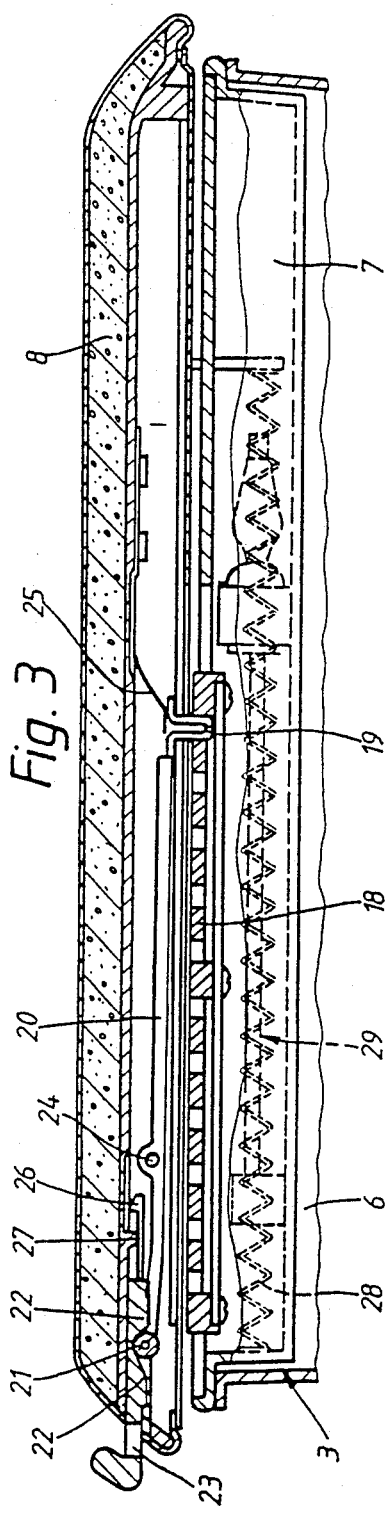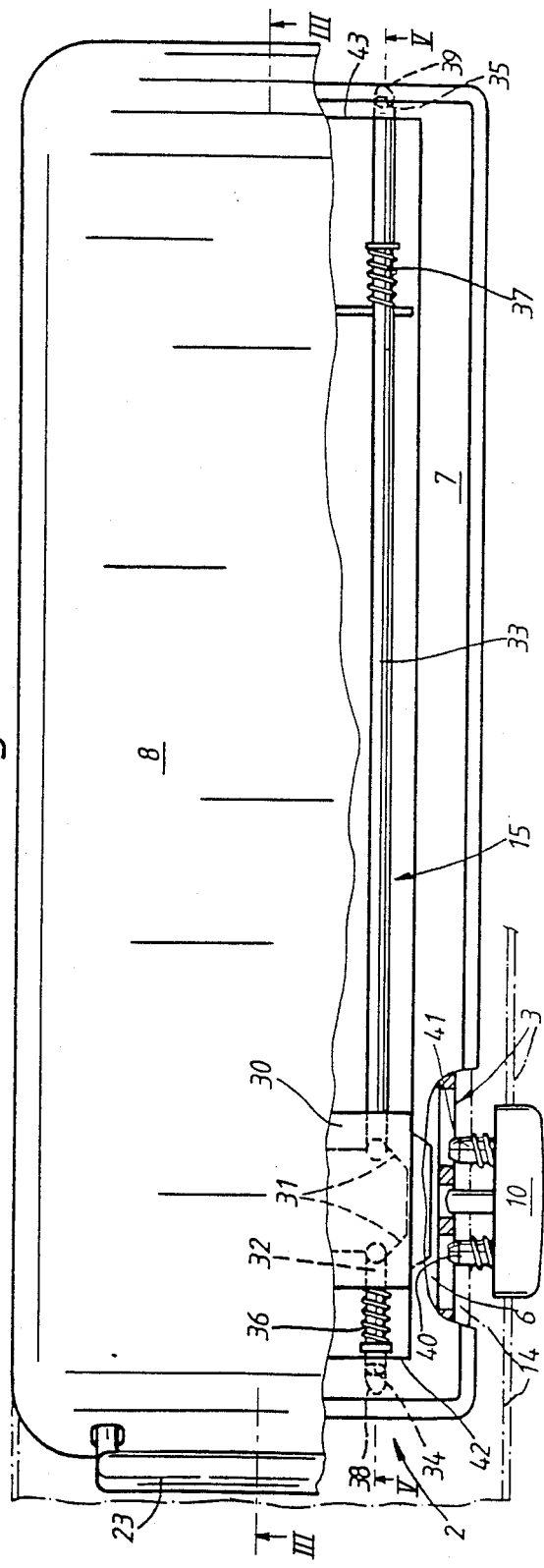

CENTER CONSOLE FOR MOTOR VEHICLES

BACKGROUND AND SUMMARY OF THE INVENTION

The present invention relates to a center console for motor vehicles which between the front seats includes a base body having a storage tray or compartment open in the upward direction, over which is arranged an armrest that is displaceable out of a position retracted between the front seats in the direction toward the instrument panel.

Such a center console is described in the DE-GM 84 37 440, in which a base body includes a storage tray open in the upward direction over which is arranged an armrest. The armrest is displaceable on the base body out of the position covering the storage tray in the direction toward the instrument panel.

During this displacement movement, however, it opens up the opening of the storage tray, as a result of which the content thereof become accessible to soiling and above all to undesired viewing, respectively, grabbing.

The present invention is therefore concerned with the task to render in a center console of the aforementioned type the opening of a storage compartment coverable also when the armrest is moved forwardly in the direction toward the instrument panel.

The underlying problems are solved according to the present invention in that a cover member for the storage compartment is pivotally connected at the base body, and in that the armrest is longitudinally displaceably supported on this cover member.

As a cover member for the storage compartment is pivotally supported at the base body, on which the armrest is then only displaceably supported, the opening of the storage tray or compartment remains covered in every displacement position of the armrest.

A track rail-ball guidance is provided for the displacement movement of the armrest which keeps the necessary force application of the actuating person very small.

Of advantage is also that the armrest is adapted to be arrestable in a detent rail in different positions relative to the cover member so that the pull-out position of the armrest can be matched to the individual requirements.

In order to facilitate the displacement of the armrest out of every position which it has just assumed, a gripping or handle lever is provided, by means of which the detent nose is adapted to be disengaged when the gripping or handle lever is acted upon in one of the two displacement directions of the armrest.

According to another feature of the present invention, the cover member is adapted to be locked up to the base body. For that purpose, a lockable unlatching push-button is supported in the base body which acts on a locking mechanism that locks up the cover member to the base body.

This locking to the base body takes place advantageously along both sides of the cover member disposed transversely to the displacement direction of the armrest in order to prevent that the cover member can be torn out of its covering position with the assistance of the forwardly pulled armrest which, as a result thereof, forms a long lever arm.

The locking mechanism is acted upon by an unlocking push-button which in its non-actuated position is lockable in its movement so that the storage compartment then cannot be opened.

BRIEF DESCRIPTION OF THE DRAWINGS

These and other objects, features and advantages of the present invention will become more apparent from the following description when taken in connection with the accompanying drawing which shows, for purposes of illustration only, one embodiment in accordance with the present invention, and wherein:

FIG. 3 is a longitudinal cross-sectional view in the center area through the storage compartment, the cover part and the armrest along section line III—III of FIG. 4; and FIG. 4 is a plan view on the center console with the storage compartment with the armrest disposed in the pushed-back position;

DETAILED DESCRIPTION OF THE DRAWINGS

Figure 1:
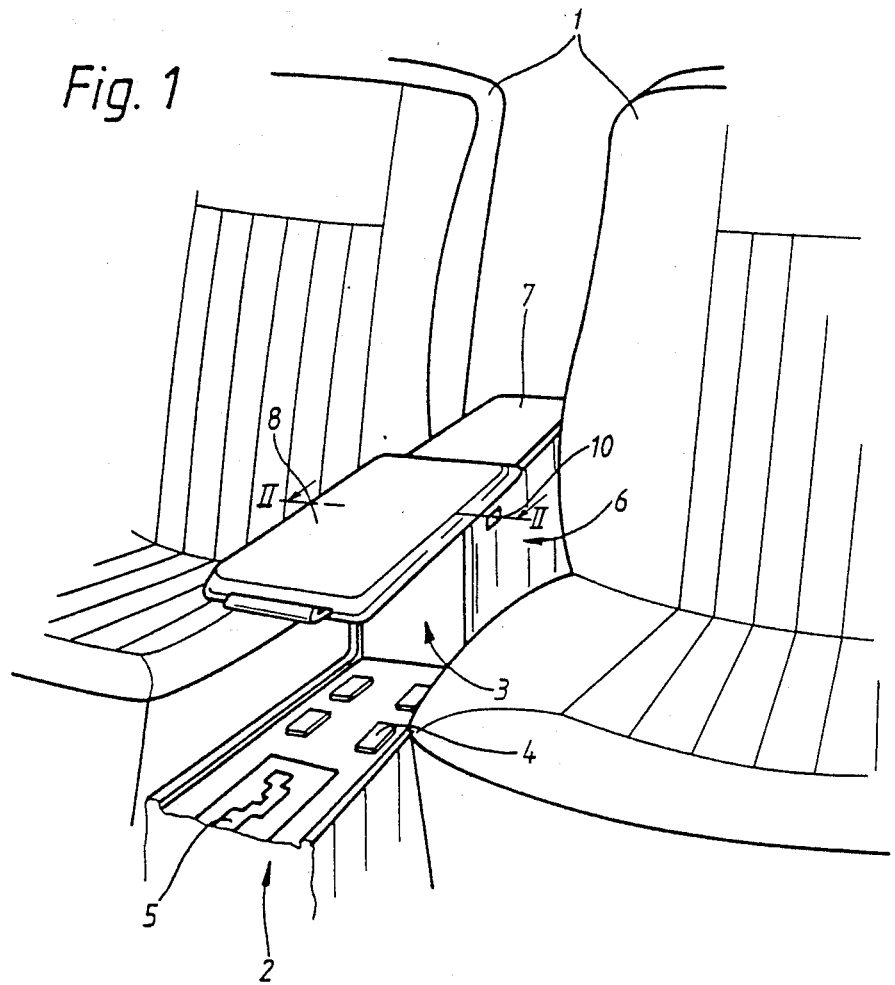
FIG. 1 is a perspective view of a center console according to the present invention with an armrest displaced into a forward position.

Referring now to the drawing wherein like reference numerals are used throughout the various views to designate like parts, FIG. 1 illustrates two front seats 1 of a motor vehicle arranged adjacent one another, between which extends a center console 2 that includes a base body 3 which, on the one hand, accommodates different actuating switches 4 and a shifting template 5 for the shifting lever and therebeyond additionally a storage compartment 6, in the area of which the base body attains a vertical extension up to approximately the angularly bent lower arm of a seated person.

The storage compartment 6 is covered by a cover member 7 which is pivotally connected at the base body 3 (not visible in FIG. 1) on the side near the passenger seat.

A comfortably padded armrest 8 is longitudinally displaceably supported on the cover member 7; the armrest 8 is illustrated in FIG. 1 in a forward position displaced in the direction toward the instrument panel (not shown).

Figure 2:
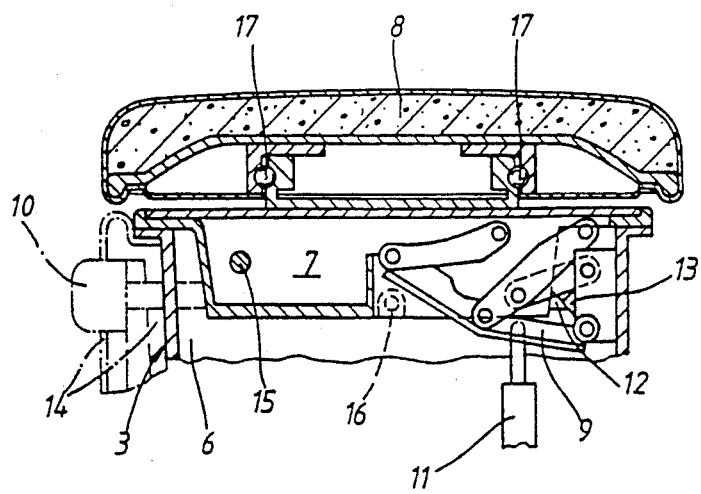
FIG. 2 is a transverse cross-sectional view in the forward area through the storage compartment, the cover member and the armrest as viewed in the direction toward the instrument panel along section line II—II of FIG. 1.

In FIG. 2, a cross section transversely through the storage compartment 6 is shown in a forward area thereof. The cover member 7 is pivotally supported in the storage compartment 6 by way of a multi-jointed hinge 9, of which a similar one is also arranged in the rear area of the storage compartment 6, and after the actuation of an unlocking push-button 10 disposed opposite the hinge 9 can be lifted out of its position near an upper edge of the storage compartment 6 and pivoted up. At least one of the hinges 9 is thereby acted upon by a gas pressure spring 11 in a manner assisting the movement in the opening direction.

In order to reduce the loads on this hinge 9 by the gas pressure spring 11 when the storage compartment 6 is closed by the cover member 7, a support nose 12 is formed-on at the cover member 7 and cooperates with a support nose 13 on the storage compartment 6. These support noses are interlocked to support the cover member 6 in the closing position at the storage compartment 6 against the force of the gas pressure spring 11.

The unlocking push-button 10 is supported in the base body 3, clothed by a covering 14, and acts on a locking mechanism 15 mounted in the cover member 7, which locks the cover member 7 to the base body 3.

Furthermore, the mounting for an interior lighting 16 not illustrated in detail is disposed in the cover member 7 which, during the opening of the storage compartment 6, is turned on automatically by way of a push-button switch.

A track rail-ball guidance 17 is effective between the cover member 7 and the armrest 8 which holds the armrest 8 safe against tilting also in a forwardly disposed position, and which enables a longitudinal displacement of the armrest 8 on the cover member 7 that can take place easily without special force application.

A detent mechanism of the displaceable armrest 8 on the cover member 7 is illustrated in FIG. 3, which takes place by means of a detent rail 18 provided with apertures and arranged on the cover member 7, in the displacement direction of the armrest 8 and by means of a detent nose 19 adapted to engage in these apertures which is pivotally connected at the armrest 8. A roller 21 is supported at a detent nose lever 20 at the end opposite the detent nose 19, which is forced by an inclined surface 22 at a gripping or handle lever 23 into a pivoting track about a pivot point 24 of the detent nose lever 20, as a result of which the detent nose 19 is pivoted out of the corresponding aperture of the detent rail 18. A spring 25 secured in the armrest 8 thereby acts as counter-force which aims at keeping the detent nose 19 always in engagement with the detent rail 18.

The gripping or handle lever 23 which also serves to disengage the detent mechanism of the armrest 8, is so supported in the armrest 8 that it is displaceable both in the direction toward the forward armrest position as also in the opposite direction, whereby it pivots the detent nose lever 20 in each case by way of one of the inclined surfaces 22 which act on the roller 21. In order to limit the displacement travel of the gripping or handle lever 23, an extension 26 is formed-on at the same that runs up against an abutment 27 in the armrest 8.

Additionally, a drawspring 28 is secured between the cover member 7 and the armrest 8 which, after disengagement of the detent nose 19, assists by its unstressing spring action the displacement movement of the armrest 8 into the forward armrest position.

Therebeyond, the cover member 7 accommodates in its hollow space different elements 29 of a central locking system by means of which also an unlocking movement of the unlocking push-button 10 is adapted to be blocked.

Figure 5:
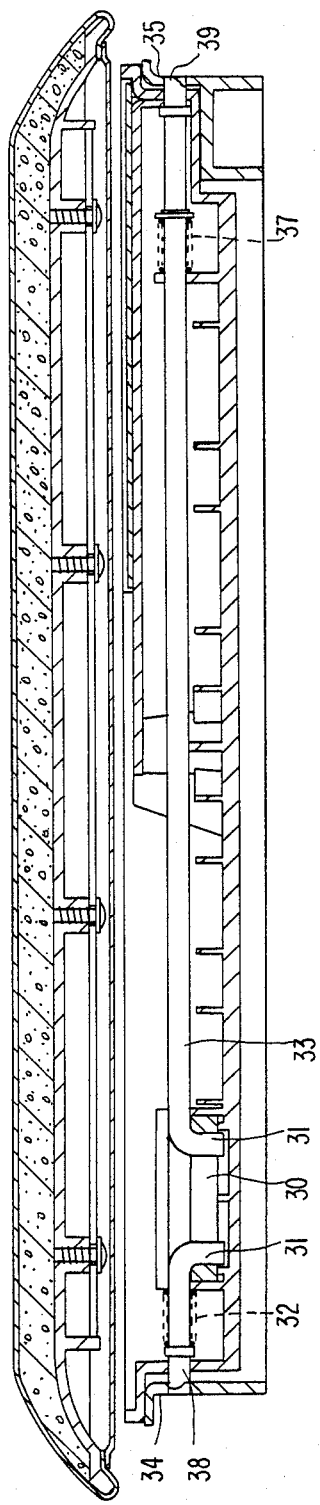
FIG. 5 is a longitudinal sectional view through the locking mechanism taken along line V—V of FIG. 4.

In FIG. 4, the locking mechanism 15 is shown which includes a slide member 30 that is displaceably supported in the cover member 7, and which during a displacement movement that is effected by depressing the unlocking push-button 10, pulls back by way of two inclined surfaces 31 one latching bolt 32 and 33 each out of a bore 34 and 35 in the base body 3 whereby two compression springs 36 and 37 are compressed. As the push-button is moved inwardly (upwardly in FIG. 4), the slide member 30 with its two ramp portions 31 moves inwardly (upwardly in FIG. 4). These ramp portions 31 engage the downward extending portions of the bolts 31 and 33 and cam drive then toward one another (FIGS. 5 and 4), against the bias force of springs 36 and 37 held on retainer rings of the bolts 32, 33, to release the other end portions of the bolts 31 and 33 from bores 34 and 35. When the push-button is released the downwardly extending portions of the bolts 32, 33 are driven apart by springs 36 and 37 and act on the ramp portions to move the slide 30 outwards (springs 40 and 41 having already moved the push-button outwards) and allow the end portions of the bolts to engage openings in the base body 3.

The cover member 7 is therewith no longer locked up to the base body 3 and can be tilted up to open up the opening of the storage compartment 6.

The latching bolts 32 and 33 now press against the inclined surfaces 31 owing to the spring force of the compression springs 36 and 37 and return the slide member 30 into its initial position after the release of the unlocking pushbutton 10, in which also the latching bolts 32 and 33 are extended by the compression springs 36 and 37. During the subsequent folding-down of the cover member 7, the latching bolts 32 and 33 press with a lower rounded-off portion 38 and 39 against the upper edge of the storage compartment 6 and are thereby pushed back against the spring force of the compression springs 36 and 37 and are again caused to engage thereby in the bores 34 and 35 in the base body 3.

The unlocking push-button 10 which is supported at the base body 3 by way of two compression springs 40 and 41, can be prevented in the actuation of the slide member and therewith in the retraction of the latching bolts 32 and 33 by an element 29 (FIG. 4) of the central locking mechanism accommodated in the cover member 7. The element 29, after a corresponding shifting operation, blocks a displacement of the slide member 30, so that the storage compartment 6 can be opened again only after the unlocking of the central locking system has moved the element 39 out of a blocking arrangement. The locking of the cover member 7 to the base body 3 by the latching bolts 32 and 33 takes place advantageously along two sides 42 and 43 of the cover member 7 disposed transversely to the displacement direction of the armrest 8 so that an effective counter-force can be opposed to a leveraged lifting of the cover member 7 with the assistance of the forwardly displaced armrest 8 which forms thereby a long lever arm.

For optical and injury reasons, the armrest 8 is thereby so constructed that it has approximately overlapping contours with the cover member 7 in the pushed-back position.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A center console for motor vehicles, comprising base body means arranged between front seats of the vehicle and having a storage compartment means having an open side in the upward direction, an armrest means arranged above the storage compartment means and having a top surface for supporting arms of passengers while they are seated on the front seats; said armrest and supporting top surface being displaceable out of a retracted push back position extending between seat backs of the front seats and in a direction toward an instrument panel into a forward armrest position wherein it continues to be available as a support surface, cover means for closing the open side of the storage compartment means and pivotally supported at the base body means, and the armrest means being longitudinally displaceably supported on the cover means from the retracted position where in overlies the cover means to its forward armrest position where it does not overlie the cover means.

2. A center console according to claim 1, wherein a track rail-ball guide means is provided for the longitudinal displacement of the armrest means on the cover means.

3. A center console according to claim 2, wherein the cover means includes a detent rail in the displacement direction of the armrest means, into which a detent nose means pivotally supported at the armrest means is adapted to be engaged.

4. A center console according to claim 3, wherein the detent nose means is adapted to be disengaged out of the detent rail by a handle lever protruding from the armrest means, the handle lever being actuatable in the direction toward the forward armrest position and also toward the retracted pushed-back position.

5. A center console according to claim 4, further comprising a spring adapted to be supported between the cover means and the armrest means which assists the displacement movement of the armrest means into the forward armrest position.

6. A center console according to claim 5, wherein a lockable unlatching push-button is supported in the base body means which acts on a locking mechanism operable to lock the cover means to the base body means.

7. A center console according to claim 6, wherein the locking to the base body means takes place along two sides of the cover means disposed transversely to the displacement direction of the armrest means.

8. A center console according to claim 7, wherein the armrest means has approximately overlapping contours with the cover means in the pushed-back position of the armrest means.

9. A center console according to claim 1, wherein the cover means includes a detent rail in the displacement direction of the armrest means, into which a detent nose means pivotally supported at the armrest means is adapted to be engaged.

10. A center console according to claim 9, wherein the detent nose means is adapted to be disengaged out of the detent rail by a handle lever protruding from the armrest means, the handle lever being actuatable in the direction toward the forward armrest position and also toward the retracted pushed-back position.

11. A center console according to claim 9, further comprising a spring adapted to be supported between the cover means and the armrest means which assists the displacement movement of the armrest means into the forward armrest position.

12. A center console according to claim 1, wherein a lockable unlatching push-button is supported in the base body means which acts on a locking mechanism operable to lock the cover means to the base body means.

13. A center console according to claim 12, wherein the locking to the base body means takes place along two sides of the cover means disposed transversely to the displacement direction of the armrest means.

14. A center console according to claim 1, wherein the armrest means has approximately overlapping contours with the cover means in the pushed-back position of the armrest means.

15. A center console according to claim 1, further comprising a spring adapted to be supported between the cover means and the armrest means which assists the displacement movement of the armrest means into the forward armrest position.

* * * * *